April 4, 1972  Z. CSUROS ET AL  3,654,111
APPARATUS FOR THE CONTROL OF HYDROGENATION-DEHYDROGENATION
PROCESS ON METAL CATALYSTS IN THE GAS PHASE
Filed May 11, 1970  3 Sheets-Sheet 1

3,654,111
APPARATUS FOR THE CONTROL OF HYDROGENATION-DEHYDROGENATION PROCESS ON METAL CATALYSTS IN THE GAS PHASE

Zoltan Csuros, Jozsef Petro, Tibor Mathe, and Antal Tungler, Budapest, Hungary, assignors to Magyar Tudomanyos Akademia, Budapest, Hungary
Filed May 11, 1970, Ser. No. 36,032
Claims priority, application Hungary, May 16, 1969, MA–1,990
Int. Cl. G01n 27/46
U.S. Cl. 204—195                    2 Claims

ABSTRACT OF THE DISCLOSURE

A method for controlling the preparation of hydrogenation-dehydrogenation catalysts by reduction and their activation by means of hydrogen. The metal connection is fixed to a metal catalyst forming a catalyst bed, the said metal connection being a measuring electrode which is connected through a glass electrolyte to a reference electrode, and the electromotive force of the cell obtained in this way is measured.

---

Figure 1:
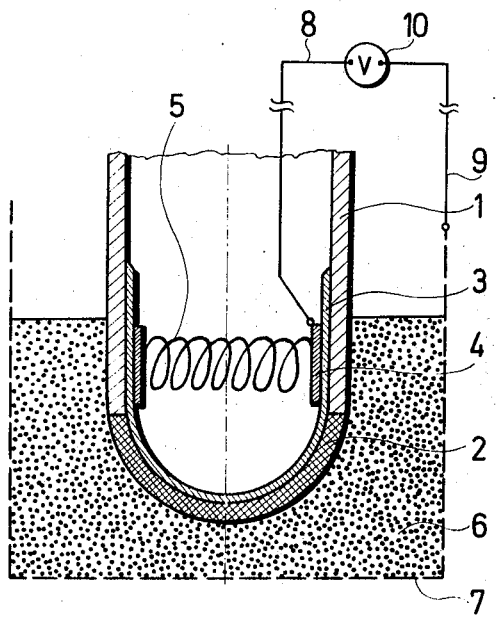

This invention relates to a method and apparatus for the control of the preparation of hydrogenation-dehydrogenation catalysts by reduction and their activation by means of hydrogen, as well as of hydrogenation-dehydrogenation processes which take place in the gas phase on metal-containing catalysts.

It is a well known fact that heterogeneous catalytic hydrogenation-dehydrogenation processes are among the most important procedures used today by the chemical industry. With the help of appropriate catalysts a great number of products can be manufactured more economically than without catalysts.

With resepect to the catalysts the works concerning the development of heterogeneous catalytic processes may be divided into two main groups: those which deal with the choice of the most appropriate catalyst for a given process and those which report on the optimum reaction conditions for the required long useful life and economic operation of the catalysts. To obtain the optimum reaction conditions laboratory and pilot plant scale experiments have to be carried out on the one hand, while on the other hand it must be ensured that the appropriate conditions are observed in the plant equipment under operation. Laboratory experiments of this type are highly complicated and considerably time consuming, while in the plant reactor only temperature can be measured and the feed and effluent substances can be qualitatively and quantitatively determined.

For the above-mentioned reasons work has been in progress for some considerable time to elaborate a method by means of which it will be possible to obtain information on the processes taking place on the surface of catalysts when in actual operation. It is to be expected that if these processes are known, the time required for the determination of the optimum conditions from the aspect of catalyst efficiency may probably be considerably shortened in the laboratory, i.e., in commercial equipment the optimum conditions from the aspect of the catalyst efficiency may be more strictly observed.

It is further a known fact that the degree to which the surface of hydrogenation-dehydrogenation catalysts is covered with hydrogen may be considered as characteristic of the surface and the state of surface, resp. The degree of being covered of the surface depends among others on the temperature, on the partial pressure of hydrogen, that is, during the catalytic reaction on the molar proportion of hydrogen to the reacting components, further on the degree of poisoning and ageing which the catalyst has suffered. A considerable part of the usual commercial equipments is built for operations in the gas phase and is packed with metal catalyst granules. Hitherto no method or apparatus has been known which might have provided means for the measurement of the degree of hydrogen adsorption in case of catalytic reactions in the gas phase, that is, for conclusions with respect to the surface state of the catalyst.

The object of the present invention is to find a simple method and a simple apparatus which even under plant conditions will provide means for the indirect measurement of hydrogen adsorption on the surface and thereby for a rapid and economical control of the catalytic process.

Now it has been found that granulated hydrogenation-dehydrogenation metal catalyst when in contact with a solid glass electrolyte behaves as a hydrogen electrode whereby the catalyst in operation will itself be applicable to the control of the catalytic process, i.e., it will be possible to draw conclusions with respect to the activity of the catalyst from the experimentally determined electrode potential. In this way an indirect possibility is opened for controlling the catalytic process.

The invention relates to a method for the control of hydrogenation-dehydrogenation metal catalysts obtained by way of reduction, and their activation with hydrogen, as well as of hydrogenation-dehydrogenation processes which take place in the gas phase on metal-containing catalysts. According to the invention a metal connection is fixed to the metal catalyst forming the catalyst bed, the said metal connection being a measuring electrode which is connected through a glass electrolyte to a reference electrode, and the electromotive force of the galvanic cell obtained in the above manner is measured.

A further object of the present invention is an apparatus for the implementation of the above-described method, said apparatus comprising a solid electrolyte layer having at 25° C. a conductivity not lower than $10^{-12}$ ohm$^{-1}$ cm.$^{-1}$, a measuring electrode in contact with one side of said solid electrolyte layer and consisting of the granulated metal catalyst forming part of the catalyst bed and being bordered by the metal surface used as connection, a reference electrode of a maximum thickness of 0.01 mm. made of a metal of Group VIII$b$ of the Periodic System or of silver, being in close contact with the other side of said electrolyte layer and also in contact with a gas containing hydrogen or oxygen, provided with a connection and hermetically separated from said measuring electrode, and a voltmeter connected to the two connections.

In an advantageous embodiment of the apparatus according to the present invention the solid electrolyte layer is a glass containing 20 to 22% by weight of sodium oxide ($Na_2O$) and not more than 8% by weight of calcium oxide (CaO). The metal belonging into Group VIII$b$ of the Periodic System is preferably platinum or rhodium.

The method and apparatus according to the present invention may further be used for the regulation of controlled catalytic processes, e.g. by connecting the apparatus as a measuring head into any, but preferably automatic, control circuit.

A change in the electromotive force indicates in case of activation in the reactor the end of the process and during the catalytic process a deviation from the stationary state, e.g. changes in temperature and in the partial pressure of hydrogen, the beginning and end of the addition of reagents, changes in the molar proportion of hydrogen to the reagents, penetration of air or the poisoning of the catalyst, etc. In this way a valuable control and recording method will be available which offers a significantly more satisfactory and simpler way for choosing and observing, resp., the optimum reaction conditions than the hitherto known methods.

FIG. 1 shows the diagram of an advantageous embodiment of the equipment according to the present invention.

In FIG. 1 the glass tube 1 is closed by the glass membrane 2. The internal surface of the glass tube is covered with a metal layer which serves as reference electrode 3, the close contact between this layer and a platinum ring 4 is ensured by a spring 5. The granulated catalyst 6 which is at the same time the measuring electrode is in contact with the nickel or silver gauze 7. The electrode conductors 8 and 9 are connected to a valve voltmeter 10 with high input resistance.

For the glass membrane 2 preferably Dole glass of the following composition is used: 22% by weight of $Na_2O$; 6% by weight of $CaO$; 72% by weight of $SiO_2$. Because of its relatively high conductivity ($1.0 \times 10^{-12}$ $ohm^{-1}$ $cm.^{-1}$ at 25° C.) this glass is suitable for the preparation of less fragile electrodes with relatively thick membranes, without unduly increasing the resistance of the reference half-cell.

The valve voltmeter can be connected to an appropriate recording instrument, e.g. to a compensograph enabling the continuous recording of the values of the electromotive force (EMF).

The reference electrode of the apparatus according to the present invention is preferably prepared in the following manner:

The internal surface of a sodium-glass tube provided with a membrane made of Dole glass is coated with a solution containing silver particles suspended in an organic solution of a resin followed by baking of the layer under a pressure of 20 mm. Hg for three hours at 250° C. After cooling a ring made of platinum plate and provided with conductors is pressed by means of a spring on the silver layer obtained by the above-described procedure. Finally the electrode is provided with capillaries for the inlet and outlet of the purified and preheated air.

The metal layer of the reference electrode may of course be applied to the surface of the glass also by some other procedure, e.g. by evaporation under vacuum of the said metal.

Figure 2:
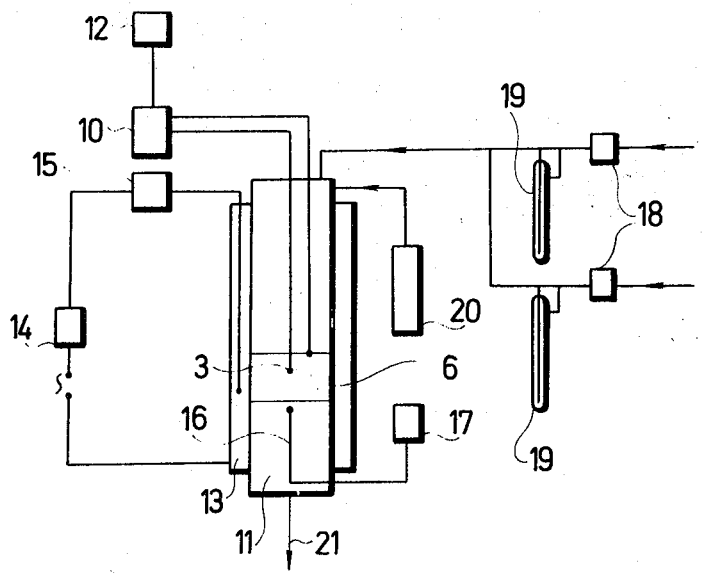

FIG. 2 is the diagram of an experimental equipment for implementation of the method according to the present invention and of the operation of said equipment.

The apparatus illustrated in FIG. 1 is enclosed into the reactor 11 in FIG. 2. The potential of the catalyst with reference to the reference electrode 3 is measured by means of the valve voltmeter 10. The EMF values are continuously recorded by the compensograph 12. The reactor tube 11 is enclosed in the electrically heated tube furnace 13 whose heating voltage is controlled by means of the toroid transformer 14 and its temperature by means of the drop stirrup regulator 15. The temperature of the catalyst bed is measured by means of the Fe-constantan thermocouple enclosed in a glass thermometer sheath 16; the mirror scale device shows the temperature.

The hydrogen and argon streams are controlled and stabilized by means of the pneumatic regulator 18; the volume flow velocity is measured by means of the differential manometers 19. The feeding device 20 driven by a synchronous motor permits the uniform feeding of the substance to be hydrogenated. The reaction mixture leaves through pipe 21.

The main advantages of the method and apparatus according to the present invention are as follows:

(a) By means of the method and apparatus, resp., according to the present invention even such changes taking place on the surface of metal catalysts in operation can be detected and recorded, for whose measurement no possibility has been hitherto known. The information obtained in this way may be used to determine the optimum reaction conditions in the laboratory on the one hand and on the other hand to maintain optimum operation conditions in plant equipments, as well as to computer control and regulate the processes.

(b) The measured EMF is extremely stable; the changes are significant and can be measured accurately.

(c) By measuring the changes in the EMF the end-point of the activation of the catalyst in the catalytic reactor is immediately apparent, whereby it will be possible to cut down the effective period of activation.

(d) The method and apparatus according to the present invention provide direct information at the time of the actual change on the processes taking place in the reactor, e.g. on the temperature changes, on the beginning and end-point of reagent addition during the catalytic reaction, on the changes in the molar proportion of hydrogen to the reagents, on changes in volume velocity, as well as on the penetration of air and catalyst poisons into the reactor.

(e) In hydrogenations on commercial scale the apparatus according to the present invention may be incorporated not only in the reactor, but also alternatively into the hydrogen pipe system after the heat-exchanger. In this way a possibility is ensured for controlling among others the purity of the hydrogen fed into the reactor. Should a change in the EMF be observed in this measuring arrangement, this will indicate ageing of the catalyst or some other discrepancy due to the impurity of the hydrogen. Quite often this solution is preferable to the usual hydrogen analyzers, or may serve as a supplement of the latter, since the hydrogen is controlled by the catalyst in the reactor.

The following examples shall serve to illustrate the apparatus and method according to the present invention.

EXAMPLE 1

Dependence of the electromotive force on the temperature and on the partial pressure of hydrogen.

In this example two important features of the apparatus according to the present invention will be described, namely the dependence of the electromotive force on the temperature and on the partial pressure of hydrogen, when in the apparatus shown in FIG. 1 the catalyst 6 consists of $Ni-SiO_2$ of a grain size of 1 to 1.4 mm. diameter and containing 55% by weight of nickel and is in contact with a hydrogen stream preheated to the desired temperature and in case of the determination of the partial pressure dependence with hydrogen diluted in the desired degree with 99.9% purity argon.

Figure 3:
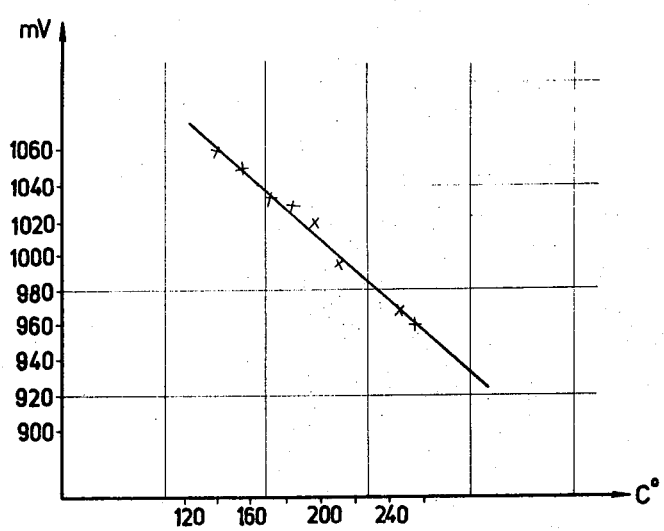

The temperature dependence of the EMF is shown in FIG. 3. The measurements were carried out with a silver reference electrode. The EMF in mv. is plotted on the ordinate, the temperature in ° C. is plotted on the abscissa. It should be noted that the experimentally obtained points represent values which have been stable within ±2 mv. for at least one hour. The same is true for FIG. 4 illustrating the correlation between EMF and the partial pressure of hydrogen where the EMF in mv. is plotted on the ordinate and the log $1/p_{H_2}$ values are plotted on the abscissa for measurements carried out again with silver reference electrode at 205° C.

Figure 4:
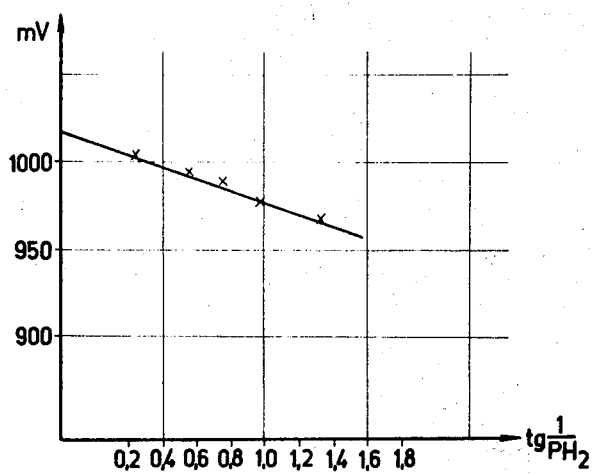

FIGS. 3 and 4 show that there is but a slight scattering among the measured values.

EXAMPLE 2

Activation of the catalyst

The present invention offers further a possibility to continuously follow the hitherto only empirically determined process of catalyst activation whereby the end of the activation process can be established.

Figure 5:
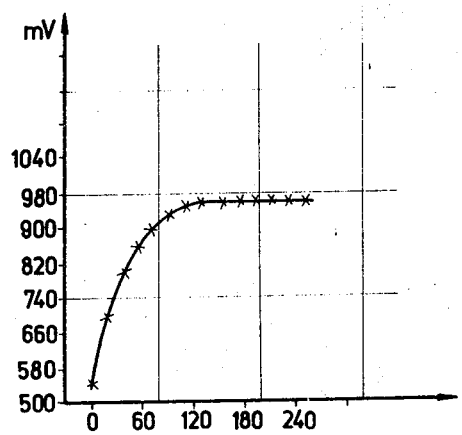

FIG. 5 shows the change of the EMF due to the reduction of the nickel oxide (NiO) catalyst in hydrogen stream of 250° C. plotted against time. The EMF in mv. is plotted on the ordinate, the time in minutes on the abscissa.

At the beginning of the experiment the catalyst was heated in argon atmosphere to 250° C. and the hydrogen content of the gas stream was then gradually raised. It appears from the figure that on the addition of hydrogen the EMF changes rapidly and reaches a constant value after about three hours, when the catalyst has attained its maximum activity. Thus with the help of this method the time of activation can be considerably shortened, since literature data usually specify an activation of 20 to 30 hours. The method according to the invention enables also the determination of the activation period.

EXAMPLE 3

Follow up of the catalyst efficiency during reaction

Figure 6:
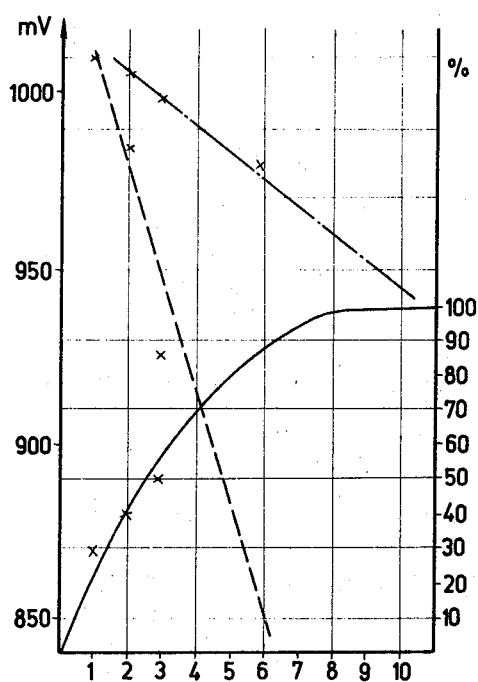

In the equipment shown in FIG. 2 benzene was hydrogenated with a Ni-SiO$_2$ catalyst containing 55% by weight of Ni. The catalyst was activated as described in Example 2. The experimental results are shown in FIG. 6 where the EMF values in mv. and, resp., the percentage conversions pertaining to the various EMF values are plotted on the ordinate and the molar proportions of H$_2$ to benzene on the abscissa. The dashed curve was obtained for a benzene feed of 0.223 mole per hour, the full curve for 0.112 mole per hour. Compared to the same volume velocity obtained by the addition of a corresponding amount of argon, the EMF values decrease almost linearly with increasing H$_2$:benzene molar ratios. It appears from FIG. 6 that the slopes of the straight lines differ for the addition of different amounts of benzene.

EXAMPLE 4

Effect of a catalyst poison

Figure 7:
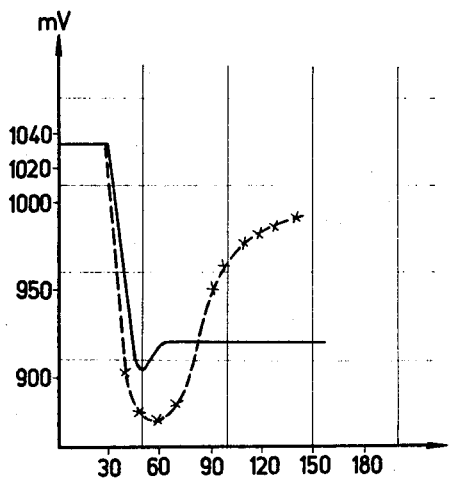

The effect of a catalyst poison on the EMF was studied. The experimental results are shown in FIG. 7 where the EMF in mv. is plotted on the ordinate and the time in minutes on the abscissa. The dashed curve refers to the hydrogenation of benzene containing 2.28 mol percent of thiophene at 170° C. For the sake of comparison the changes in the EMF values during the hydrogenation of benzene free of thiophene under identical experimental conditions are plotted as a full curve. It appears from FIG. 7 that when thiophene-free benzene is hydrogenated, the EMF reaches a constant value after about 30 minutes, while when the benzene to be hydrogenated contains thiophene no constant value is obtained even after 150 minutes.

It should be pointed out that in the first case the constant EMF values are associated with constant conversion values (91.2%), while in the second case conversion decreases continuously (from 91.2% to 62%) indicating the poisoning of the catalyst.

EXAMPLE 5

Effect of the penetration of air

Figure 8:
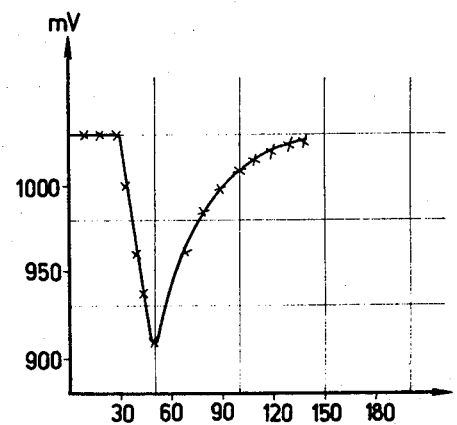

FIG. 8, where the EMF in mv. is plotted on the ordinate and the time in minutes on the abscissa, shows the effect of air which may penetrate the hydrogenation reactor. It appears that the constant EMF value measured at 170° C. when the catalyst is in contact with uncontaminated hydrogen stream drops significantly on the addition of (about 10% by vol. of) air in the 30th minute and approaches the initial value when again in contact with hydrogen only.

It follows further from the above examples that by applying the present invention the activation of the metal catalyst and the effect of the latter during the reaction may be followed continuously. The constant EMF values measured in accordance with the present invention indicate also the stationary operation of the reactor; when the EMF values change then this is an indication of some change in the operation conditions within the reactor.

What we claim is:

1. An apparatus for the control of hydrogenation-dehydrogenation processes on metal catalysts in the gas phase, comprising a solid electrolyte layer having at 25° C. a conductivity not lower than $10^{-12}$ ohm$^{-1}$ cm.$^{-1}$ a measuring electrode in contact with one side of said solid electrolyte layer and consisting of the granulated metal catalyst forming part of the catalyst bed and being bordered by the metal surface used as connection, a reference electrode made of a metal of Group VIII$b$ of the Periodic System or of silver and having a thickness not greater than 0.01 mm., being in close contact with the other side of said electrolyte layer and also in contact with a gas containing hydrogen or oxygen and being provided with a connection and hermetically separated from said measuring electrode, and a voltmeter connected to both connections.

2. An apparatus as claimed in claim 1, wherein the solid electrolyte layer is a glass containing 20 to 22% by weight of sodium oxide (Na$_2$O) and not more than 8% by weight of calcium oxide (CaO).

References Cited

UNITED STATES PATENTS

| | | | |
|---|---|---|---|
| 2,383,709 | 8/1945 | Cary et al. | 204—195 |
| 3,084,030 | 4/1963 | Ballou et al. | 204—195 |
| 3,297,551 | 1/1967 | Alcock | 204—1 T |
| 3,471,392 | 10/1969 | Kansky | 204—195 |

TA-HSUNG TUNG, Primary Examiner

U.S. Cl. X.R.

204—1 T